(12) United States Patent
Sandström et al.

(10) Patent No.: US 12,704,736 B2
(45) Date of Patent: Aug. 11, 2026

(54) OPTICAL ELEMENT WITH 3D GRADIENT REFRACTIVE INDEX

(71) Applicant: EDMUND OPTICS, INC., Barrington, NJ (US)

(72) Inventors: Lars Sandström, Philadelphia, PA (US); Gary Pajer, Yardley, PA (US); Shawn Scarfo, Pittsgrove, NJ (US)

(73) Assignee: EDMUND OPTICS, INC., Barrington, NJ (US)

( * ) Notice: Subject to any disclaimer, the term of this patent is extended or adjusted under 35 U.S.C. 154(b) by 222 days.

(21) Appl. No.: 18/727,466

(22) PCT Filed: Jan. 9, 2023

(86) PCT No.: PCT/US2023/060301
§ 371 (c)(1),
(2) Date: Jul. 9, 2024

(87) PCT Pub. No.: WO2023/133547
PCT Pub. Date: Jul. 13, 2023

(65) Prior Publication Data

US 2025/0116876 A1 Apr. 10, 2025

Related U.S. Application Data

(60) Provisional application No. 63/297,984, filed on Jan. 10, 2022.

(51) Int. Cl.

| | |
|---|---|
| ***G02B 27/14*** | (2006.01) |
| ***G02B 3/00*** | (2006.01) |
| ***G02B 23/10*** | (2006.01) |

(52) U.S. Cl.
CPC ......... *G02B 27/141* (2013.01); *G02B 3/0087* (2013.01); *G02B 23/105* (2013.01)

(58) Field of Classification Search
CPC .. G02B 27/141; G02B 3/0087; G02B 23/105; F41G 1/30
See application file for complete search history.

(56) References Cited

U.S. PATENT DOCUMENTS

| | | | | |
|---|---|---|---|---|
| 3,942,901 A * | 3/1976 | Ekstrand | G02B 27/30 359/635 |
| 5,267,063 A * | 11/1993 | Ray | F21V 7/05 349/67 |

(Continued)

FOREIGN PATENT DOCUMENTS

| | | |
|---|---|---|
| DE | 102006046555 A1 | 4/2008 |
| JP | H10311905 A | 11/1998 |

OTHER PUBLICATIONS

International Search Report and Written Opinion for corresponding PCT International Application No. PCT/US2023/060301 issued Aug. 1, 2023, 17 pages.

(Continued)

*Primary Examiner* — Alexander P Gross
(74) *Attorney, Agent, or Firm* — Duane Morris LLP

(57) ABSTRACT

An optical element includes a traditional element having a single refractive index to transmit light from a scene from one direction; a gradient-index element attached to the traditional element and having an off-axis focus point and a refractive index that changes in a direction from a center of the gradient-index element to adjust an angle of incident light that is incident from a second direction reflected across an irradiance profile of the incident light to collimate the reflected light and reduce an optical aberration of the traditional element; and a dichroic coating between the traditional element and the gradient-index element to reflect the incident light and transmit the light from the scene, wherein the traditional element reduces an optical power of the gradient-index element.

12 Claims, 4 Drawing Sheets

(56) References Cited

U.S. PATENT DOCUMENTS

| | | | | |
|---|---|---|---|---|
| 2010/0245761 | A1 | 9/2010 | Widman et al. | |
| 2010/0261958 | A1 | 10/2010 | Webb et al. | |
| 2012/0081800 | A1* | 4/2012 | Cheng .................... | G03B 21/00 359/720 |
| 2015/0029424 | A1 | 1/2015 | Gordon et al. | |
| 2016/0377886 | A1 | 12/2016 | Quiroga et al. | |
| 2017/0299898 | A1 | 10/2017 | Gallina et al. | |

OTHER PUBLICATIONS

Extended European Search Report issued for European Patent Application No. 23737810.4 dated Jan. 7, 2026, 5 pages.

* cited by examiner

OPTICAL ELEMENT WITH 3D GRADIENT REFRACTIVE INDEX

CROSS REFERENCE TO RELATED APPLICATIONS

This application is a National Stage Application, filed under 35 U.S.C. 371, of International Patent Application No. PCT/US2023/060301, filed on Jan. 9, 2023, which claims the benefit of U.S. Provisional Patent Application No. 63/297,984, filed Jan. 10, 2022, which are hereby incorporated by reference for all purposes as if fully set forth herein.

BACKGROUND

Some optical systems, such as a reflex sight, require the injection of a virtual or real image from one axis onto another. For example, a reflex sight allows the user to look through a partially reflecting lens element and see an illuminated projection of an aiming point or some other image like a reticle superimposed on the field of view. In a so-called 'red-dot' reflex sight, a narrow band of light emitted by an LED or laser is reflected from a lens element to a shooter to project the aiming point. Reflex sights are typically designed for use in close-target situations and are therefore compact and designed to allow a shooter to quickly train the reflex sight and firearm on a target. Such reflex sights are typically more compact than an optical sight used on a sniper rifle, for example, and reduce the overall size and weight of the combined firearm and optical sight. Further, such reflex sights provide a field-of-view that allows the shooter to quickly position the optical sight and firearm relative to the target without reducing the situational awareness of the shooter.

Conventional reflex sights cannot provide a large field-of-view (i.e., having a clear aperture diameter greater than approximately 22 millimeters), as doing so typically requires an optics train associated with the reflex sight to be lengthy, thereby increasing the overall size of the reflex sight. The lengthy optics train is required to provide an optical path having a long focal length to minimize parallax with customary spherical lenses. Reflex sight manufacturers therefore strive to balance the desire to have a compact reflex sight with the desire to provide a large field-of-view, all while minimizing parallax.

Typically, this is done with refractive, off axis optics with an internal reflective surface such that one axis can be folded onto a second until they become colinear. Reflecting a beam or image off axis can cause a range of aberrations, and creates a need to utilize more complicated lenses to compensate for reflected aberrations while minimizing any introduction of aberrations on the transmitted beams or images. Any such optical system should accomplish one or all of the following goals:

- Reflect and collimate a point source or divergent image with some field to make it colinear with an axis of a different optical path.
- Reflect a collimated beam with or without some field to make it colinear with an axis of a different optical path.
- Act as an afocal system with or without some field for a transmitted light path.
- Correct for aberrations typical of an off axis reflected system.
- Minimize aberrations induced on the transmitted light path.

A red-dot sight requires good imagery in two different optical paths. In one path, the red dot is projected, and in the other path is the view of the target. The red dot is reflected and the target is transmitted. Poor imagery in the red dot will show up as a blurred or larger dot. Poor imagery of the target will degrade the ability to discern and resolve the scene. In addition, the bore sight between the two has to be maintained. That is, the red dot has to be projected over the center of the field of view and where the firearm shoots. The reflex sight, being a visual device, has to be designed for an "eye box" or "eye circle", an area projected from the sight in which the eyes of the shooter are to be located to view both the reflected and transmitted images, Operation of the reflex sight has to allow for a decenter between the red dot and the shooters eye. Both imagery and boresight has to be maintained for eye locations within the eye box. That is, "parallax" (a boresight error between the red dot and target for eye pupil decenter) has to be minimized to small levels such that the device can be used to acquire and align the sight to the target for any eye position within the eye box.

Similarly, other optical applications can benefit from injecting an object plane or point source into a collimated image. For example, an experimental or prototype optical system on a laboratory bench can use a collimated beam injected with a point source such as a fiber optic. An imaging device such as one that a surgeon might wear during surgery can use an indicator like a reticle or point source projected to the object plane. Also, flow cytometry, a technique used to detect and measure physical and chemical characteristics of a population of cells or particles, uses multiple lasers all focused at the same point. Optics used to combine the lasers can be reduced.

Point light sources produce a beam having a Gaussian irradiance profile wherein the irradiance is highest at the center of the beam and falls off rapidly at radial distances away from the center. Refractive lenses are used to convert Gaussian light beams into lines having uniform irradiance along the length of the line. Such refractive lenses are typically formed by polishing or rounding off a portion of the lens such that the distance that a beam must travel through the lens varies from the center of the lens to the perimeter of the lens. For example, one surface of such lenses can have a shape of a curved roof line. The process of mechanically forming such profiles is imprecise and iterative. Hence, these lenses are expensive to produce.

Another method to achieve an aberration limited injection of a beam or image is to use a series of optical components, including a gradient-index (GRIN) element that changes index of refraction in an axis. GRIN optics refers to optical effects resulting from a gradient of the refractive index of a material in a lens. GRIN lenses are typically used to reduce aberrations. The gradient of the refractive index can be created either by applying coatings to a component or by controlling the refractive index of the lens such that the refractive index of the component varies from one position on the lens to another.

Common GRIN elements are limited to changing their index of refraction either radially as shown in FIG. 1, or across the length of the optical axis as in shown in FIG. 2. FIG. 1 represents a circular surface of a lens 100 with a radial change in the index of refraction $\Delta n$ from the center of the lens 100 to the outer edge of the lens 100 indicated by the arrow. FIG. 2 represents a cylindrical lens 200 with an axial change in the index of refraction $\Delta n$ along the light path indicated by the arrow from a light incident surface of the lens 200 to a light exit surface of the lens 200.

Such optical systems are known to have inherent issues. The ideal reflective coating between the first and second lenses should reflect only the wavelength of the illuminated light and transmit all other wavelengths. However, such coatings are imprecise and result in tinting of ambient light from the target image transmitted to the viewer. The tinting can be offset by adding tuned anti-reflective (AR) coatings to the outer surfaces of the first and second lenses. Additionally, by nature, spherical lenses have aberrations. GRIN elements make it more difficult to achieve the desired coating performance because of the physical variation of the index of refraction across the lens element requiring a corresponding non-uniform coating.

SUMMARY OF THE INVENTION

To overcome the problems described above, an embodiment of the present disclosure provides an optical element includes a traditional element having a single refractive index to transmit light from a scene from one direction; a gradient-index element attached to the traditional element and having an off-axis focus point and a refractive index that changes in a direction from a center of the gradient-index element to adjust an angle of incident light that is incident from a second direction reflected across an irradiance profile of the incident light to collimate the reflected light and reduce an optical aberration of the traditional element; and a dichroic coating between the traditional element and the gradient-index element to reflect the incident light and transmit the light from the scene, wherein the traditional element reduces an optical power of the gradient-index element.

In an embodiment, the dichroic coating is on the traditional element. In an embodiment, the traditional element is optically bonded to the gradient-index element.

The optical element can further include an optical substrate attached between the traditional element and the gradient-index element, wherein the dichroic coating is on the optical substrate.

According to a disclosed embodiment, an optical element includes a first gradient-index element to transmit light from a scene in one direction; a second gradient-index element attached to the first gradient-index element and having an off-axis focus point and a refractive index that changes radially outward in a direction from a center of the gradient-index element to adjust an angle of incident light that is incident from a second direction and reflected across an irradiance profile of the incident light to collimate the reflected light; and a dichroic coating between the first gradient-index element and the second gradient-index element to reflect the incident light and transmit the light from the scene, wherein the second gradient-index element reduces an optical power of the first gradient-index element.

The optical element can further include an optical substrate attached between the first gradient-index element and the second gradient-index element, wherein the dichroic coating is on the optical substrate.

According to an embodiment, an optical element includes an optic to transmit light from a scene in one direction; a first freeform element attached to the optic and having an off-axis focus point and a first freeform surface to collimate light reflected from incident light that is incident from a second direction; and a dichroic coating between the optic and the first freeform element to reflect the incident light and transmit the light from the scene, wherein the optic reduces an optical power of the first freeform element.

The optical element can further include an optical substrate attached between the optic and the first freeform element, wherein the dichroic coating is on the optical substrate.

In an embodiment, the optic is a second freeform element.

The optical element can further include a first gradient-index element between the first freeform element and the dichroic coating.

In an embodiment, the optic is a second gradient-index element.

The optical element can further include a second freeform element bonded to the second freeform element.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

An optical element that changes index of refraction in any/all directions provides for the ability to correct a range of aberrations and reduce cost compared to a conventional reflex lens. Such an optical element can be fabricated using 3D printing technology. The refractive index across a freeform GRIN lens can be customized and tuned to change the power, sharpen focus, and balance aberrations where needed.

The 3D printing technology considered utilizes modified commercial inkjet printers with proprietary nanoparticle doped liquid polymers to replace the conventional ink. Each polymer blend has a different index of refraction and can be blended during printing to create new resultant indexes the same way inks are blended during printing to create new colors. After each layer is printed, the layer is cured to solidify the layer before the next layer is printed on top, allowing for the ability to create a lens in three dimensions with index of refraction varying continuously in all directions. This allows for the creation of complex components, including GRIN lenses, that can be produced quickly and autonomously, which leads to lower overall cost. This can also be done in low volume significantly lowering the cost of prototype components compared to the cost of low volume custom lenses that are traditionally manufactured.

Figure 1:
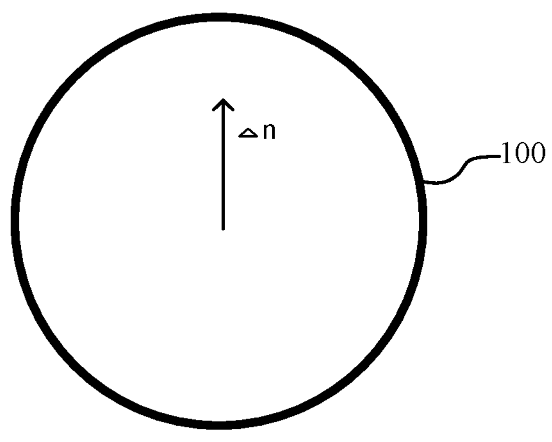
FIG. 1 shows a radial change in the index of refraction from the center of a lens to the outer edge of the lens, according to related art.
Figure 2:
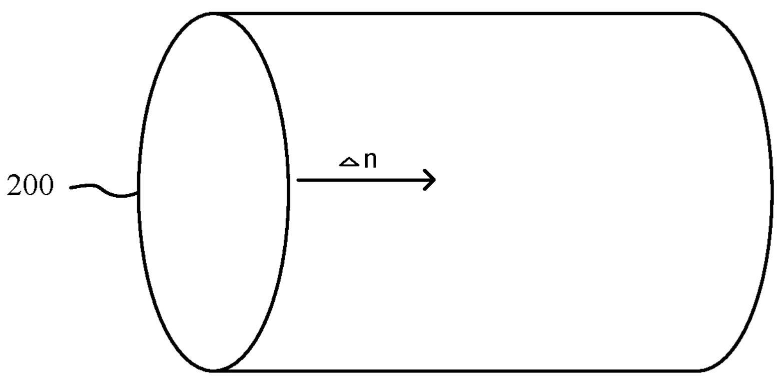
FIG. 2 shows an axial change in the index of refraction along the light path from a light incident surface of the lens to a light exit surface of the lens, according to related art.
Figure 3:
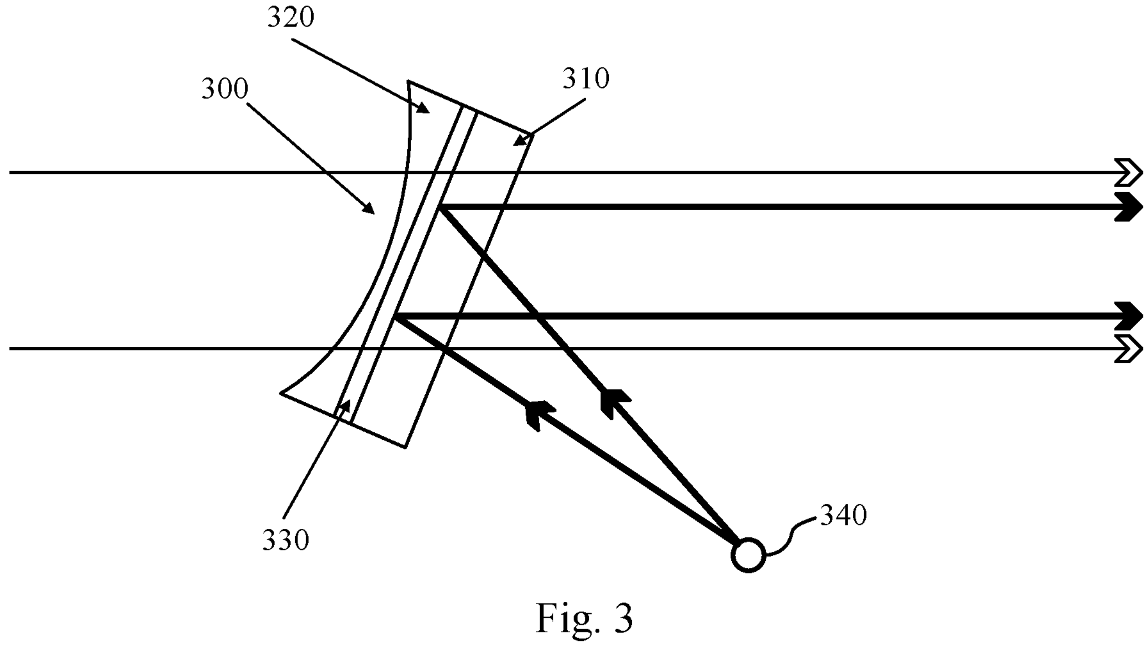
FIG. 3 shows a lens including a GRIN lens bonded with a traditional lens, according to an embodiment of the present disclosure.

FIG. 3 shows a lens 300 including a 3D printed GRIN lens 310 bonded with a traditional lens 320, having a single index of refraction, and including a dichroic coating 330 in a reflex application. The GRIN lens 310 is a positive element with an off-axis focus and is used to collimate a point light source 340, such as an LED or laser diode with a narrow wavelength and a Gaussian beam profile, or a divergent image. The GRIN lens 310 is made such that the refractive index changes radially outward from the center of the lens to adjust the angle of the reflected light across the irradiance profile to achieve the collimation. That is, the refractive index of the GRIN lens 310 can be varied in all 3 directions, thus having both an axial and radial variation. As such, the GRIN lens 310 can be customized to the wavelength and the beam profile of the light source 340 at their relative geometric orientation and need not be symmetric.

FIG. 3 shows that the dichroic coating 330, a series of optical coatings designed to reflect certain wavelengths of light and transmit other wavelengths, provided on a surface of the traditional lens 320 reflects light emitted by the light source 340 while passing all other wavelengths associated with the transmitted optical path from the scene through the lens. In a reflex sight, the scene is the target image. The traditional lens 320 provides the optical inverse power of the GRIN lens 310 is used to undo the power of the GRIN lens 310 to achieve a goal of zero power through the lens 300.

In this configuration, additional considerations are necessary in the design of the GRIN lens 310 to balance aberrations from the traditional lens 320. The traditional lens 320 can be made from glass, plastic, crystal, or any other suitable material depending on criteria including wavelength range, polarization, and environmental stability. The surfaces of the traditional lens 320 can be plano, spherical, or aspherical.

The dichroic coating 330 can be on an interior bonded surface of the GRIN lens 310 or the traditional lens 320. However, providing a suitable dichroic coating on the GRIN lens 310 could be difficult to achieve because of the refractive index changes across the GRIN lens 310. Here, the dichroic coating can be provided on a surface of the traditional lens 320. Optionally, because of cost associated with fall out in coating the traditional lens 320, providing the dichroic coating on a simple third substrate with a single refractive index such as a clear glass, colored glass, or plastic could be a less expensive alternative. Although this adds complexity of including the coated third substrate in the optically bonded structure. The addition of an AR coating to either or both of the exterior surfaces of the GRIN lens 310 or the traditional lens 320 or an exterior bonded colored glass substrate could be used to balance and normalize the overall color transmission of the lens 300.

Bonding optical elements together implies the use of any suitable optical-grade adhesive and technique to attach the optical elements to each other. Materials and methods should eliminate any air gap, trapped air, and contaminates between the optical elements while providing desired optical performance, adhesive strength, and environmental stability.

Figure 4:
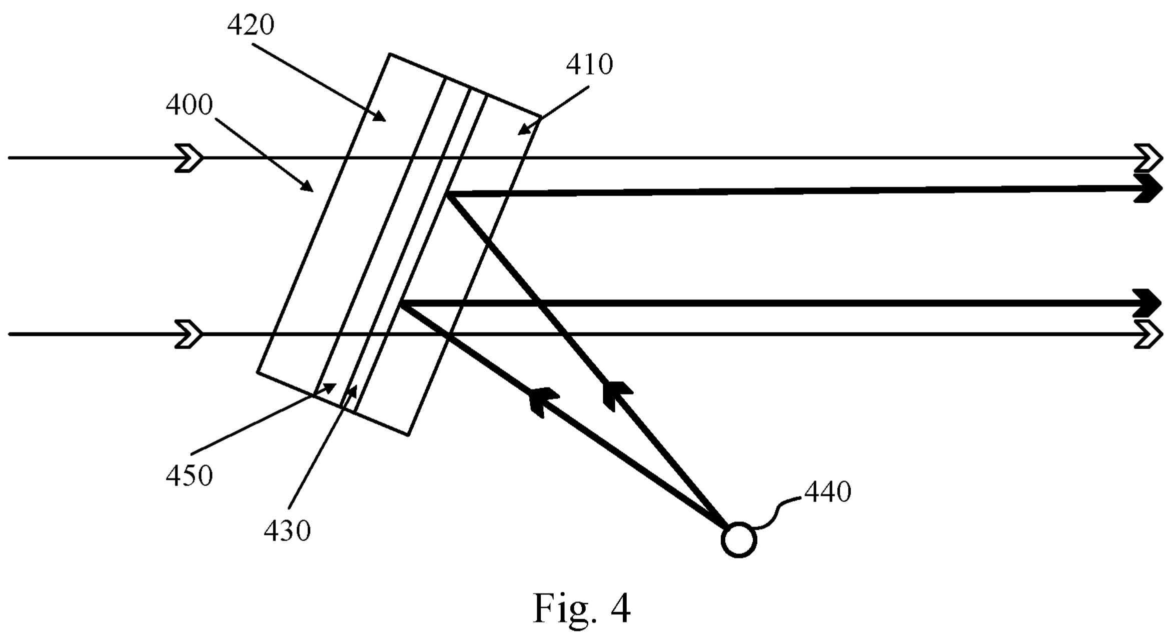
FIG. 4 shows a lens including a first GRIN lens bonded with a second GRIN lens and a substrate, according to an embodiment of the present disclosure.

FIG. 4 shows a lens 400 that includes a first GRIN lens 410, a positive element with an off-axis focus point, to collimate the light source 440, as discussed above, and a second GRIN lens 420 providing the optical inverse power to undo the power of the first GRIN lens 410 and correct for any field related aberrations induced by the first GRIN lens 410. Hence, the first GRIN lens 410 can be optimized for the collimation and any resulting power and aberrations can be minimized by tuning the second GRIN lens 420. Because of the difficulty in providing a suitable dichroic coating on either of the two GRIN lenses 410, 420, the dichroic coating 430 can be on a third substrate 450 with a single refractive index optically bonded between the first and second GRIN lenses 410, 420.

FIGS. 5-8 show lens configurations where injecting a point source or divergent image onto an optical path can be achieved by lenses with freeform refractive surfaces. A freeform surface implies a lack of rotational symmetry. Spherical surfaces are completely symmetric. Aspherical surfaces are rotationally symmetric. Off-axis aspherical surfaces are rotationally symmetric, but the axis of symmetry is located away from the mechanical center of the lens, or at a point in space which is completely outside of the lens. Freeform implies a total lack of rotational symmetry, and can have any shape at all.

These surfaces can be made of glass, plastic, or crystal and can be molded or diamond turned directly. Each layer of the system can be bonded together, or deposited directly onto a surface.

Figure 5:
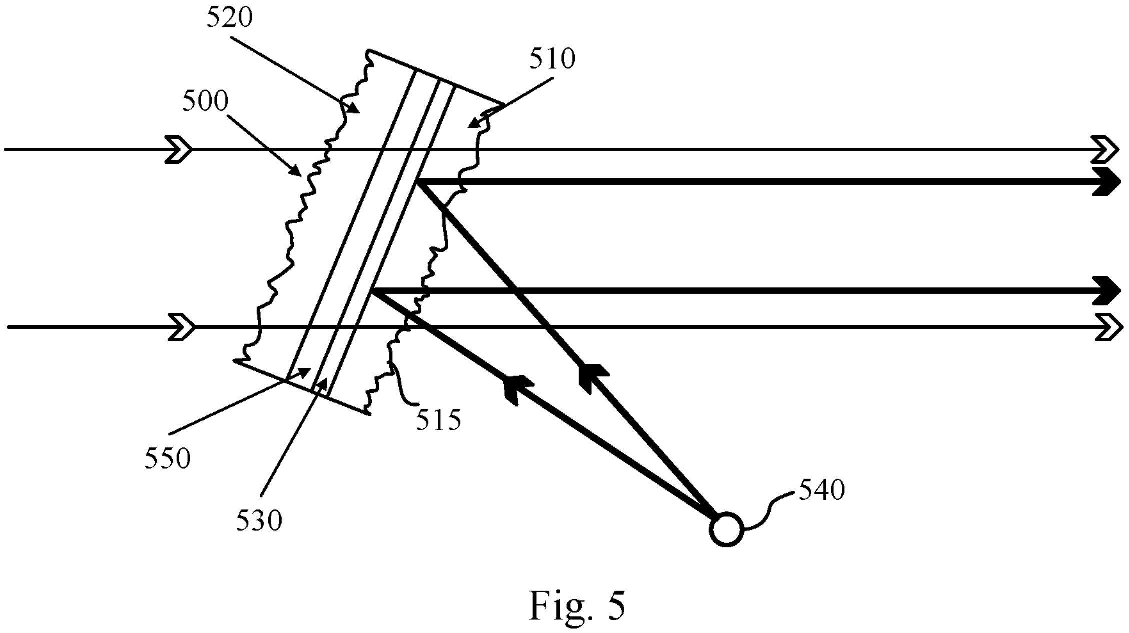
FIG. 5 shows a lens including a first freeform lens bonded to a second freeform lens and a substrate, according to an embodiment of the present disclosure.

FIG. 5 shows a lens 500 that includes a first freeform lens 510, a positive element with an off-axis focus point, including a first freeform surface 515 surface that collimates the light incident from a point light source 540 or image through two passes through the first freeform surface 515. In order to collimate light, the lens 500 must either have a convex surface shape, or the refractive index must be higher in the center of the optical than near the edge. It is possible to combine surface curvatures and index gradient in other ways, so long as the total optical path length is longer through the center of the optic than near the edge. As shown, light from the light source 540 passes through the first freeform surface 515, reflects off of a dichroic coating 530 on a substrate 550, and exits the same first freeform surface 515 achieving collimation. As shown, light from the target image passes directly through the lens 500 to the viewer. A second freeform lens 520 provides the optical inverse power to undo the power of the first freeform lens 510 and balances any aberrations caused by the first freeform lens 510.

Figure 6:
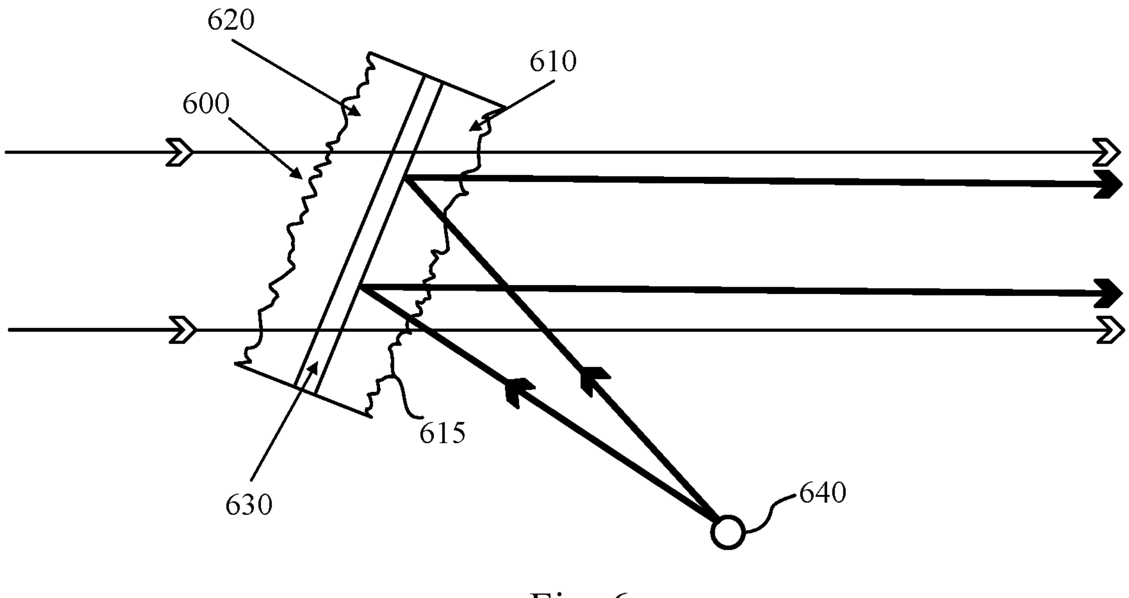
FIG. 6 shows a lens including a first freeform lens bonded to a second freeform lens, according to an embodiment of the present disclosure.

The lens 600 shown in FIG. 6 can operate like the lens 500. Optionally, as shown in FIG. 6, the extra substrate can be eliminated and the dichroic coating 630 can be located on one of the internally bonded surfaces of the first freeform lens 610 or the second freeform lens 620. As shown, light from the light source 640 passes through the first freeform surface 615, reflects off of the dichroic coating 630, and exits the same first freeform surface 615 achieving collimation. As shown, light from the target image passes directly through the lens 600 to the viewer. A second freeform lens 620 balances any aberrations caused by the first freeform lens 610.

Figure 7:
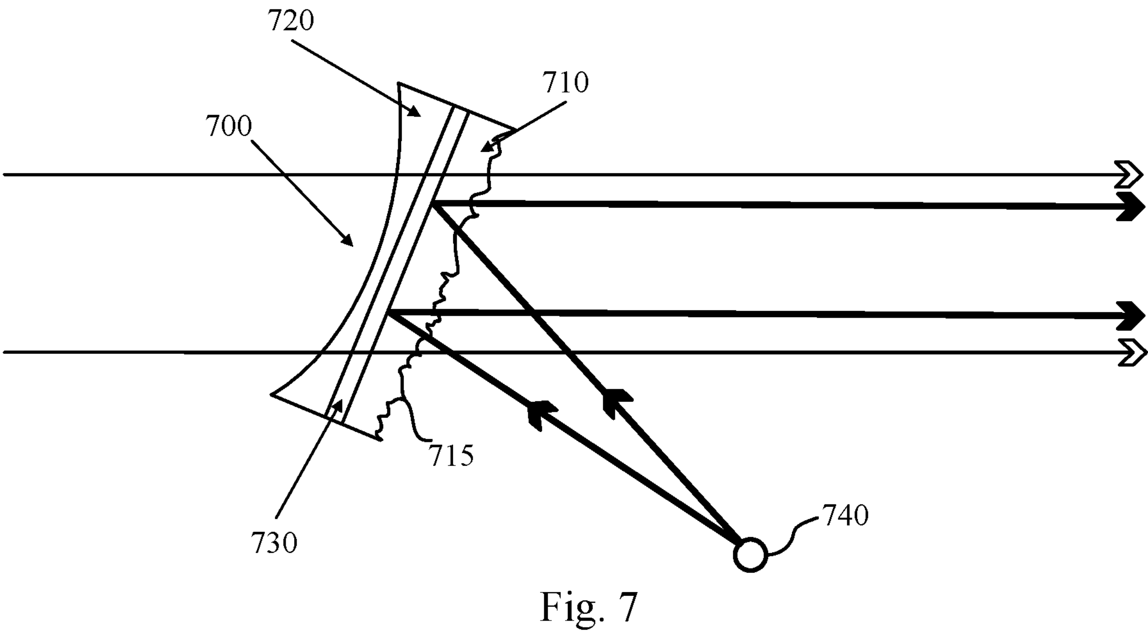
FIG. 7 shows a lens including a freeform lens bonded to a traditional lens, according to an embodiment of the present disclosure.

Optionally, as shown in FIG. 7, the second freeform lens can be replaced with a with a traditional lens 720 that can be made from glass, plastic, or crystal as described above. FIG. 7 shows a lens 700 that includes a freeform lens 710, a positive element with an off-axis focus point, including a first freeform surface 715 surface that collimates the light incident from a point light source 740 or image through two passes through the first freeform surface 715. As shown, light from the light source 740 passes through the first freeform surface 715 of a freeform lens 710, reflects off of a dichroic coating 730, either on the freeform lens 710 or traditional lens 720, and exits the same first freeform surface 715 achieving collimation. As shown, light from the target image passes directly through the lens 700 to the viewer. The traditional lens 720 provides the optical inverse power to undo the power of the freeform lens 710 and balances any aberrations caused by the first freeform lens 710.

Figure 8:
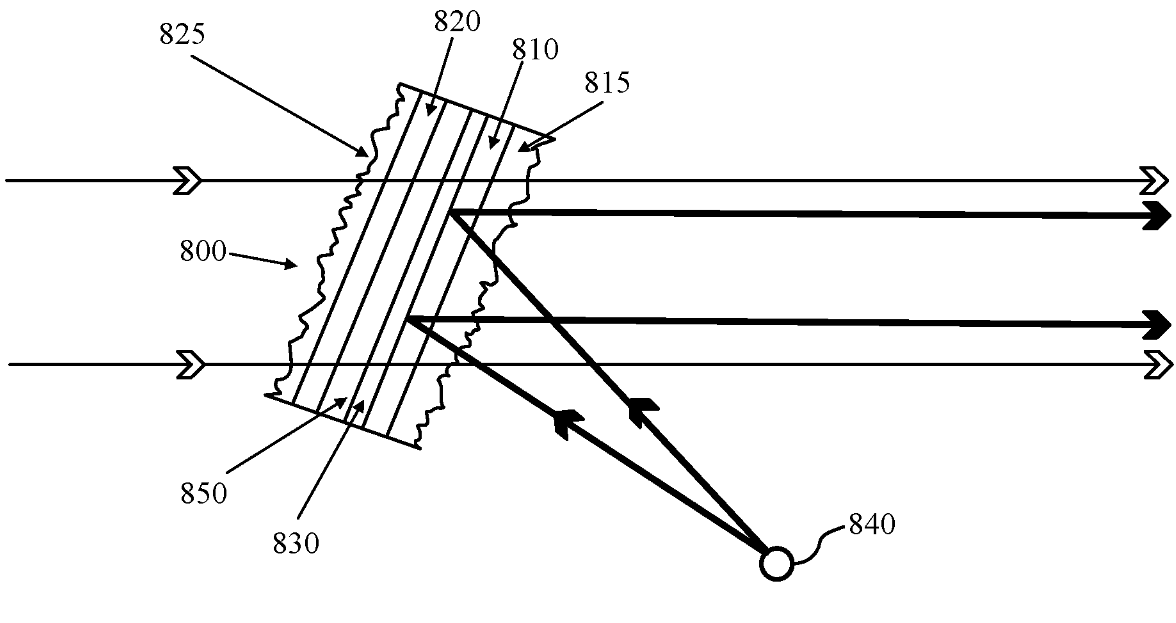
FIG. 8 shows a lens including a freeform lens bonded to a GRIN lens, according to an embodiment of the present disclosure.

FIG. 8 shows a lens 800 that includes a first GRIN lens 810 bonded to or integrated with a first freeform surface optic 815. The first freeform surface optic 815 a positive element with an off-axis focus point to collimate the light source 840, as discussed above. Additionally, lens 800 includes a second GRIN lens 820 bonded to a second freeform surface optic 825. The second freeform surface optic 825 provides the optical inverse power to undo the power of the first freeform surface optic 815 resulting in an overall zero-power system. Additionally, any field related aberrations induced by the first GRIN lens 810 and first freeform surface optic 815 can be corrected. Hence, the first GRIN lens 810 and first freeform surface optic 815 can be optimized for the collimation and any resulting power and aberrations can be minimized by tuning the second GRIN lens 820 and second freeform surface optic 825. Because of the difficulty in providing a suitable dichroic coating on either of the two GRIN lenses 810, 820, the dichroic coating 830 can be on a third substrate 850 with a single refractive index optically bonded between the first and second GRIN lenses 810 and 820.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An optical element, comprising:

a traditional element having a single refractive index to transmit light from a scene from one direction;

a gradient-index element attached to the traditional element and having an off-axis focus point and a refractive index that changes in a direction from a center of the gradient-index element to adjust an angle of incident light that is incident from a second direction reflected across an irradiance profile of the incident light to collimate the reflected light and reduce an optical aberration of the traditional element; and a dichroic coating between the traditional element and the gradient-index element to reflect the incident light and transmit the light from the scene, wherein the traditional element reduces an optical power of the gradient-index element.

2. The optical element of claim 1, wherein the dichroic coating is on the traditional element.

3. The optical element of claim 1, wherein the traditional element is optically bonded to the gradient-index element.

4. The optical element of claim 1, further comprising an optical substrate attached between the traditional element and the gradient-index element, wherein the dichroic coating is on the optical substrate.

5. An optical element, comprising:

a first gradient-index element to transmit light from a scene in one direction;

a second gradient-index element attached to the first gradient-index element and having an off-axis focus point and a refractive index that changes in a direction from a center of the gradient-index element to adjust an angle of incident light that is incident from a second direction and reflected across an irradiance profile of the incident light to collimate the reflected light; and a dichroic coating between the first gradient-index element and the second gradient-index element to reflect the incident light and transmit the light from the scene, wherein the second gradient-index element reduces an optical power of the first gradient-index element.

6. The optical element of claim 5, further comprising an optical substrate attached between the first gradient-index element and the second gradient-index element, wherein the dichroic coating is on the optical substrate.

7. An optical element, comprising:

an optic to transmit light from a scene in one direction;

a first freeform element attached to the optic and having an off-axis focus point and a first freeform surface to collimate light reflected from incident light that is incident from a second direction; and a dichroic coating between the optic and the first freeform element to reflect the incident light and transmit the light from the scene, wherein the optic reduces an optical power of the first freeform element.

8. The optical element of claim 7, further comprising an optical substrate attached between the optic and the first freeform element, wherein the dichroic coating is on the optical substrate.

9. The optical element of claim 7, wherein the optic is a second freeform element.

10. The optical element of claim 7 further comprising a first gradient-index element between the first freeform element and the dichroic coating.

11. The optical element of claim 7, wherein the optic is a second gradient-index element.

12. The optical element of claim 11 further comprising a second freeform element bonded to the second freeform element.

* * * * *